United States Patent [19]

Schneider

[11] Patent Number: 4,710,089
[45] Date of Patent: Dec. 1, 1987

[54] ARTICLE UNSTACKING SYSTEM

[75] Inventor: Thomas C. Schneider, Oak Forest, Ill.

[73] Assignee: Velten & Pulver, Inc., Chicago Ridge, Ill.

[21] Appl. No.: 868,026

[22] Filed: May 29, 1986

[51] Int. Cl.$^4$ .................. B65G 59/02; B65G 59/08
[52] U.S. Cl. .................................. 414/118; 221/227; 414/123
[58] Field of Search .............. 414/98, 100, 117, 118, 414/119, 123, 124; 221/227

[56] References Cited

U.S. PATENT DOCUMENTS

| | | | |
|---|---|---|---|
| 3,401,811 | 9/1968 | Gräsvoll | 414/118 X |
| 3,521,763 | 7/1970 | Heide et al. | 414/118 |
| 3,780,884 | 12/1973 | Jones | 414/118 |
| 3,831,809 | 8/1974 | Knickerbocker | 221/227 |
| 3,891,097 | 6/1975 | Shackelford et al. | 414/123 X |
| 3,917,082 | 11/1975 | Howard et al. | 414/118 |
| 4,034,894 | 7/1977 | Lermann et al. | 221/227 |
| 4,119,219 | 10/1978 | Marschke | 414/123 X |
| 4,527,940 | 7/1985 | Biery | 414/118 X |

*Primary Examiner*—Leslie J. Paperner
*Attorney, Agent, or Firm*—Emrich & Dithmar

[57] ABSTRACT

An article unstacking system includes an infeed conveyor which delivers stacks of articles to an unstacker which has an inclined support wall and a carriage reciprocatively movable parallel to the support wall and carrying a platform disposed in a plane perpendicular to the support wall for cooperation therewith to define a generally V-shaped trough into which the stack is received. The carriage is moved upwardly until the top article is engaged by a discharge roller which lifts it from and peels it off the stack. To facilitate separation of the top article, the stack is retracted a short distance as soon as the top article is engaged by the discharge rollers, so that the carriage undergoes repeated up and down movements until the stack is depleted. Carriage drive is effected by short-stroke and long-stroke air cylinders, with the former being carried by the movable element of the latter.

19 Claims, 14 Drawing Figures

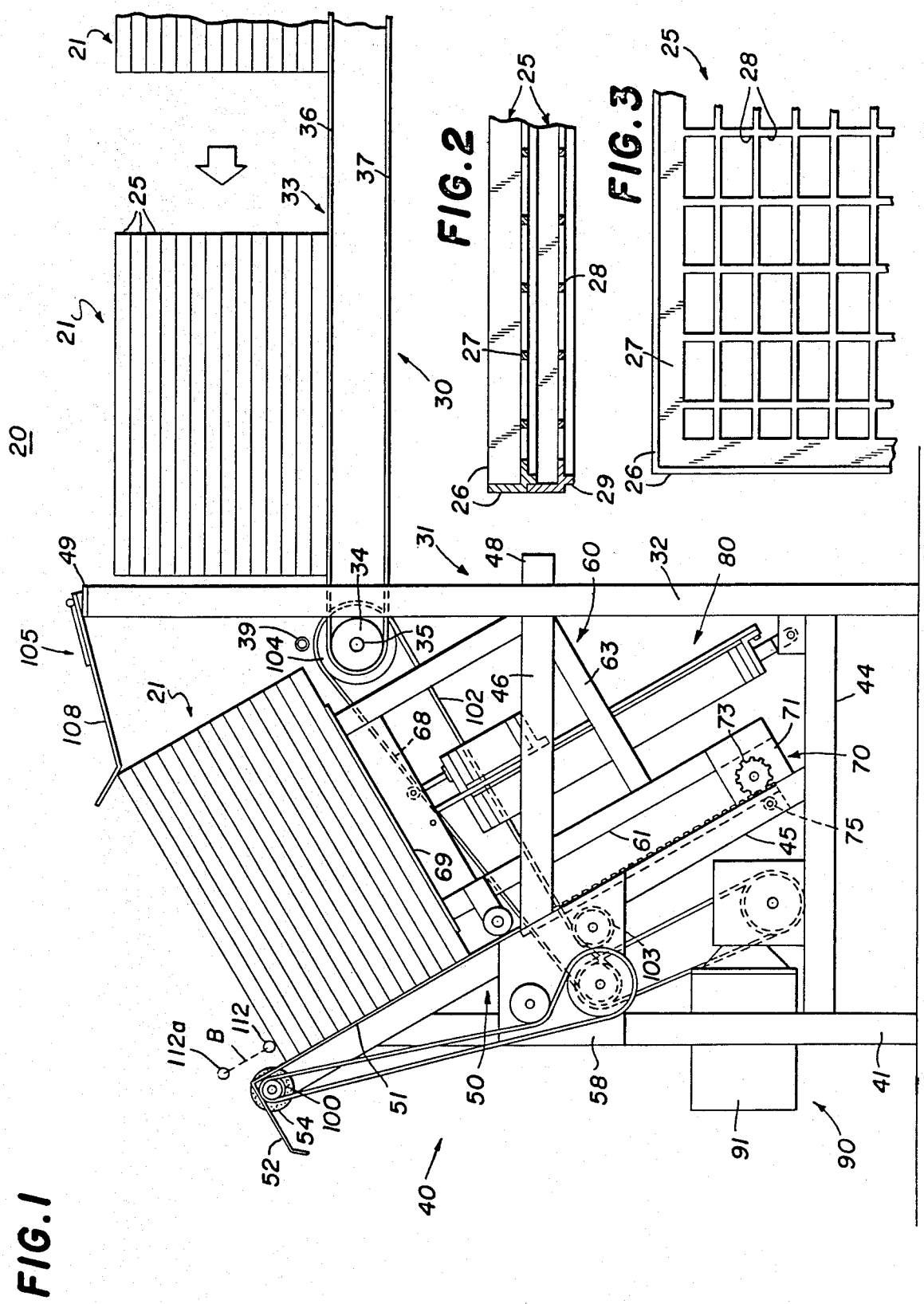

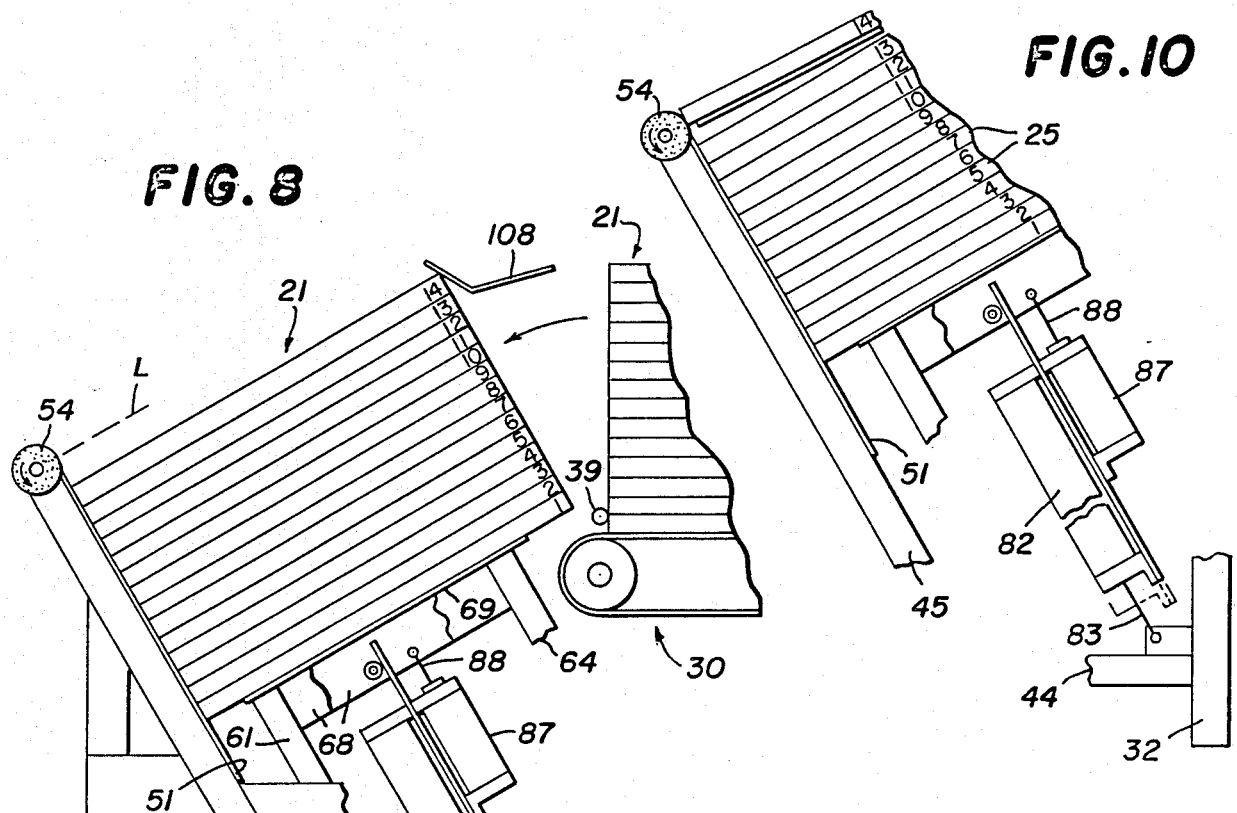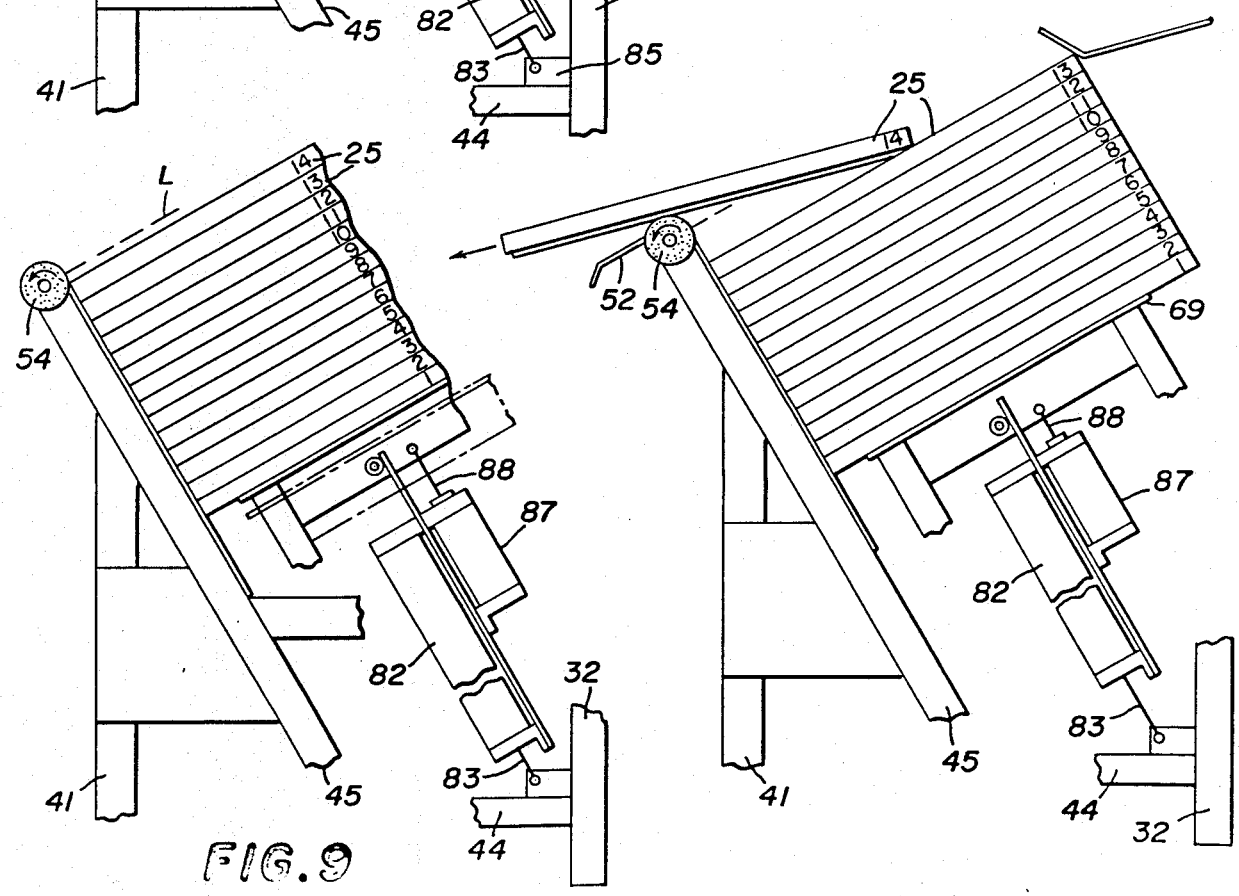

CRM TIME DELAY NON RETENTATIVE
(RESETS WHEN RUNG GOES FALSE)

MOTOR STARTER

16" CYL. RETRACT
SOL. VALVE-116a

UNSTACK TIME DELAY
(RETENTATIVE RETAINS COUNT
WHEN RUNG GOES FALSE)

4,710,089

ARTICLE UNSTACKING SYSTEM

BACKGROUND OF THE INVENTION

The present invention relates to systems and apparatus for handling stacks of articles and, in particular, to apparatus for unstacking articles from a stack thereof. The invention has particular application to the unstacking of stacks of partially nested articles, including but not limited to, pallets, trays, pans, baskets, or the like.

In the baking industry, products are commonly handled, stored and shipped in carriers or containers, such as pallets, baskets, pans, trays, or the like. Thus, there is a constant need for handling empty carriers. Commonly they are stacked for storage and the stacks are moved to locations where they are needed, at which location they must be unstacked. Automatic equipment for performing such unstacking operations are well known in the art.

One prior form of unstacking device utilizes a hook which reaches in and grabs the top carrier and pulls it from the stack. The carriers are frequently very shallow carriers having perforated or lattice-work bottoms. When used for unstacking such containers, the prior device has the disadvantage of occasionally reaching too far into the stack and pulling more than one container from the stack. Also, the hook mechanism is usually designed to coact with a perforated bottom pattern of a particular type of container and is not readily adaptable for use with containers having different perforation patterns.

One type of unstacking device which avoids this difficulty is disclosed in U.S. Pat. No. 3,521,763, and utilizes rollers or belts which frictionally engage the edge of the top container and peel it off the stack. While this "peel-off" mode of operation is commonly used in unstacking devices, when it is used with items of substantial mass (as opposed, for example, to sheets of material, such as paper) it is necessary to utilize auxiliary gripping means, such as another belt, roller or the like for gripping the opposite edge of the top item so as to ensure its separation and removal from the stack. This is particularly true in the case of partially nested containers.

SUMMARY OF THE INVENTION

It is a general object of the present invention to provide an unstacking system which avoids the disadvantages of prior systems while affording additional structural and operating advantages.

An important feature of the invention is the provision of an unstacking system which can unstack articles, such as containers, and is readily adaptable to unstacking containers of different configurations.

Another feature of the invention is the provision of an unstacking system of the type set forth which utilizes "a peel-off" mode of operation, while requiring frictional engagement with only a single edge of the article.

Still another feature of the invention is the provision of an unstacking system of the type set forth, which is relatively simple and of economical construction and is readily adaptable to automatic operation.

In connection with the foregoing feature, it is another feature of the invention to provide a system of the type set forth, which continuously and automatically handles a series of stacks of articles.

These and other features of the invention are attained by providing apparatus for removing articles one at a time from the top of a stack of articles having an axis intersecting the top and bottom articles in the stack at the centers thereof, the apparatus comprising: stack support means for receiving the stack thereon, the support means including carriage means movable with respect to the remainder of the support means for effecting reciprocating movement of the stack in directions parallel to its axis; drive means coupled to the carriage means for effecting movement thereof and of the stack thereon between a discharge condition wherein the top article in the stack is disposed in a discharge position and a withdrawn condition below the discharge condition; discharge means engageable with the top article in the stack when it is disposed in its discharge position for removing it from the stack; and control means coupled to the drive means for controlling the operation thereof, the control means being responsive to movement of the top article to its discharge position for causing movement of the carriage means to its withdrawn condition to facilitate separation of the top article from the stack, the control means being responsive to removal of the top article from the stack when the carriage means is in its withdrawn condition for causing movement of the carriage means back to its discharge condition.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of an unstacking system constructed in accordance with and embodying the features of the present invention;

FIG. 2 is a fragmentary view in vertical section of two stacked containers of a type with which the present invention is intended to be used;

FIG. 3 is a fragmentary top plan view of one of the containers illustrated in FIG. 2;

FIG. 8 is a fragmentary view, similar to FIG. 1, with portions of the apparatus foreshortened and illustrated in an initial, fully-retracted condition, after having just received a stack of articles;

FIG. 9 is a view similar to FIG. 8, and illustrating the apparatus with a full stack of articles and with the short-stroke cylinder fully extended;

FIG. 10 is a view similar to FIG. 9, with both cylinders extended to bring the stack to a discharge condition wherein the top article is lifted therefrom;

FIG. 11 is a view similar to FIG. 10, illustrating the long-stroke cylinder extended and the short-stroke cylinder retracted to facilitate removal of the top articles from the stack;

DESCRIPTION OF THE PREFERRED EMBODIMENT

Figure 4:
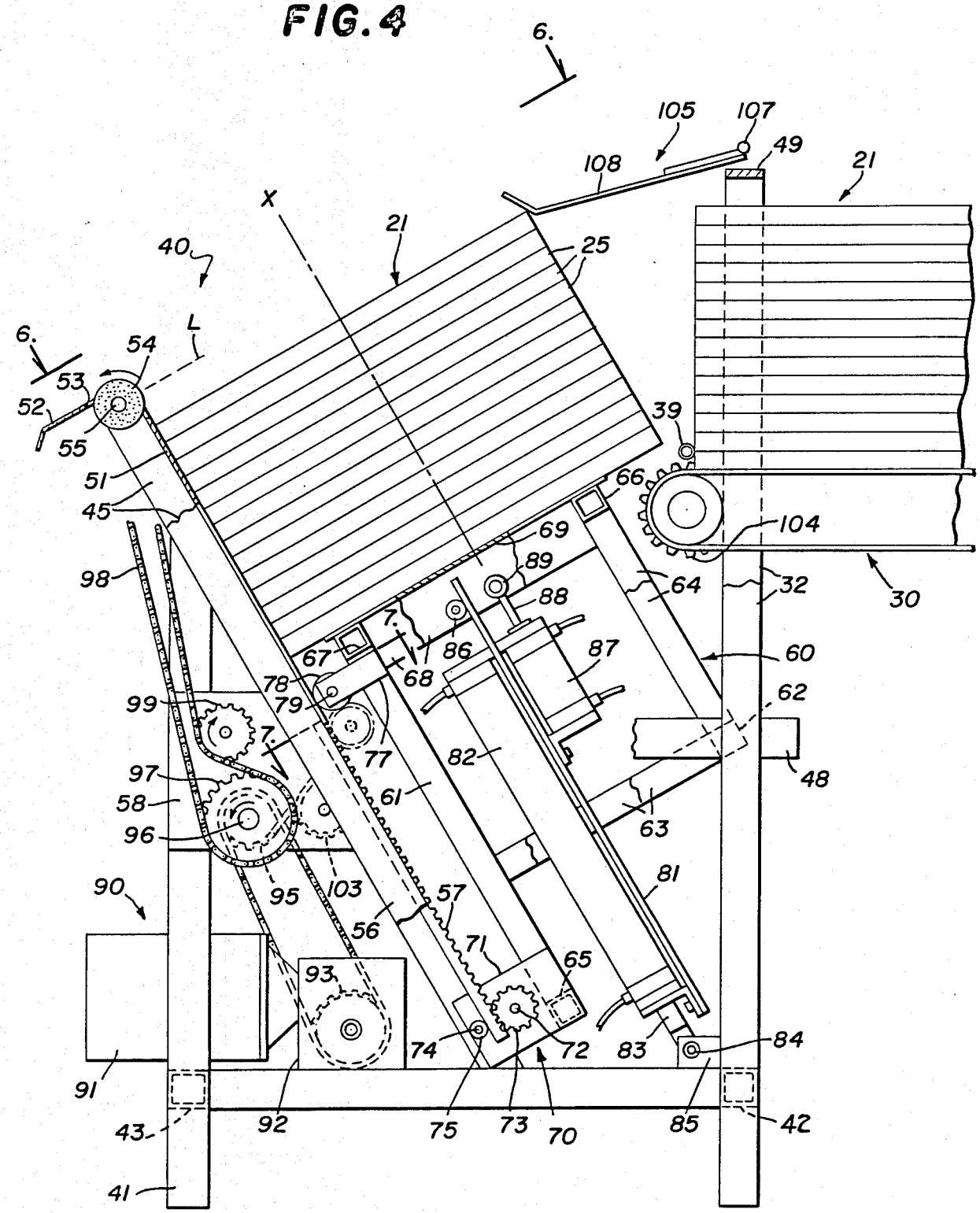
FIG. 4 is an enlarged fragmentary view of the left-hand portion of FIG. 1, with parts broken away more clearly to illustrate the construction.

Referring to FIGS. 1–3, there is illustrated an unstacking system, generally designated by the numeral 20, constructed in accordance with and embodying the features of the present invention. The system 20 is designed for handling stacks 21 of containers, such as pallets 25. The invention has particular application to the handling of containers of the type normally used in the baking industry, and, while they will be generically referred to as "pallet" herein, it will be appreciated that this term includes pallets, trays, pans, baskets or the like. Such pallets 25 may be formed of metal, plastic, flat wood, peal boards and the like. For purposes of illustration, there are disclosed pallets 25 which are in the form of shallow, rimmed, nestable trays with perforated bottoms, but it will be appreciated the pallets need not be nestable or have perforated bottoms.

More particularly, referring to FIGS. 2 and 3, each of the pallets 25 is rectangular in shape, having an encompassing upstanding peripheral side wall 26 and a bottom wall 27, which has a lattice-work configuration defining perforations 28 therethrough. Integral with the bottom wall 27 and depending therefrom is a rectangular bottom rim or flange 29, spaced a slight distance inwardly from the peripheral side wall 26 to facilitate nesting of stacked pallets 25, as can best be seen in FIG. 2. While the bottom wall 27 is characterized by a rectangular lattice defining rectangular apertures, it will be appreciated that the present invention is also usable with pallets having other types of bottom perforation patterns. While the pallets 25 are illustrated as being relatively shallow (typically having a height of about one inch), it will be appreciated that the invention is also usable with deeper pallets.

The unstacking system 20 includes an infeed conveyor 30, which feeds a series of stacks 21 to an unstacker 40. More particularly, the system 20 includes a frame 31 having a pair of parallel, spaced-apart rear support posts 32, which support the discharge end of the infeed conveyor 30. The conveyor 30 comprises an endless flexible conveyor belt 33 which extends around a drive roller 34 rotatably mounted on a shaft 35 carried by the support posts 32 in a suitable manner. The conveyor 30 has a generally horizontal support reach 36 and a return reach 37. A photo-eye sensor 39 is disposed adjacent to the discharge end of the conveyor 30 for a purpose to be explained more fully below.

Figure 5:
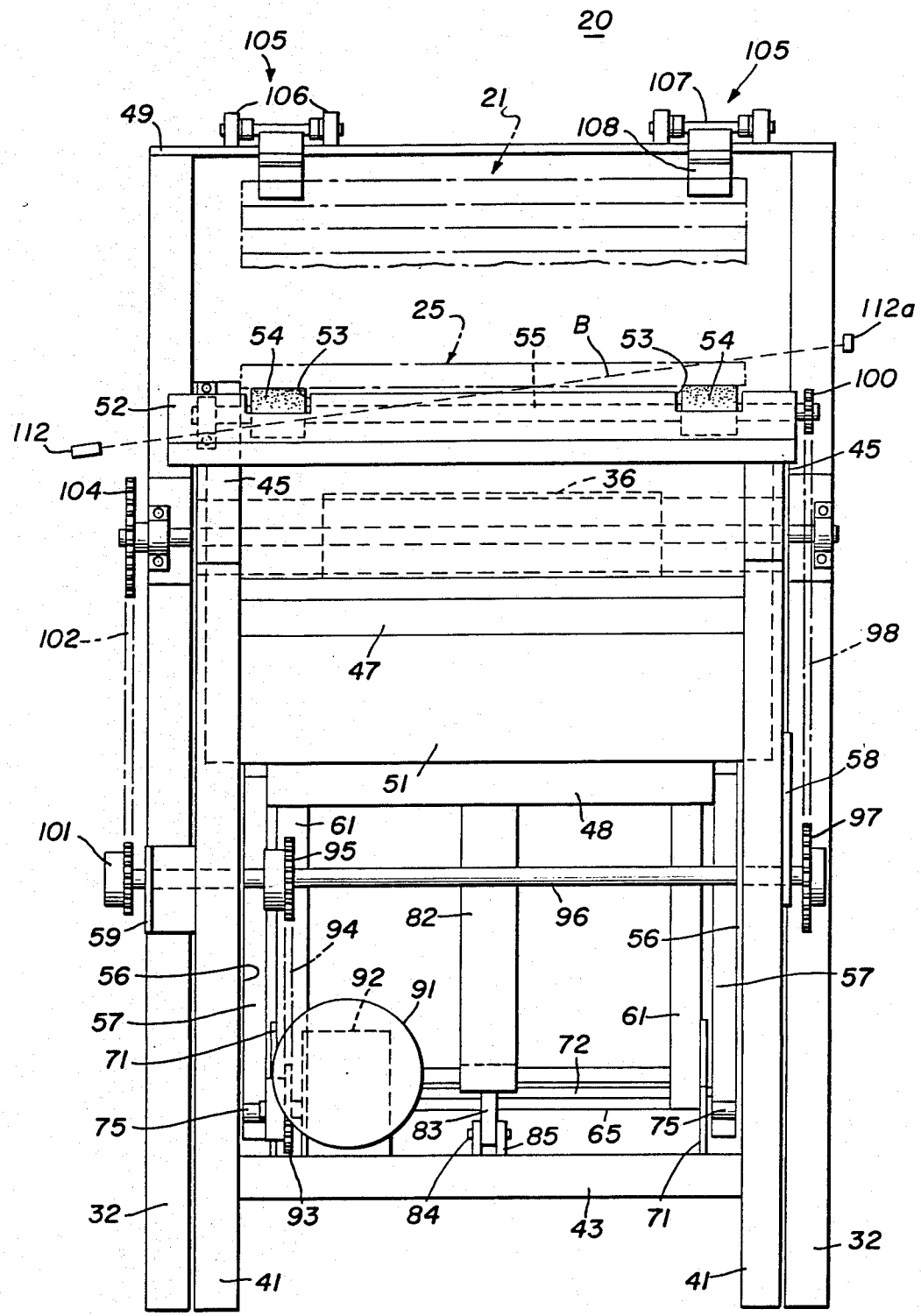
FIG. 5 is an end elevational view of the system of FIG. 4, as viewed from the left-hand end thereof.
Figure 6:
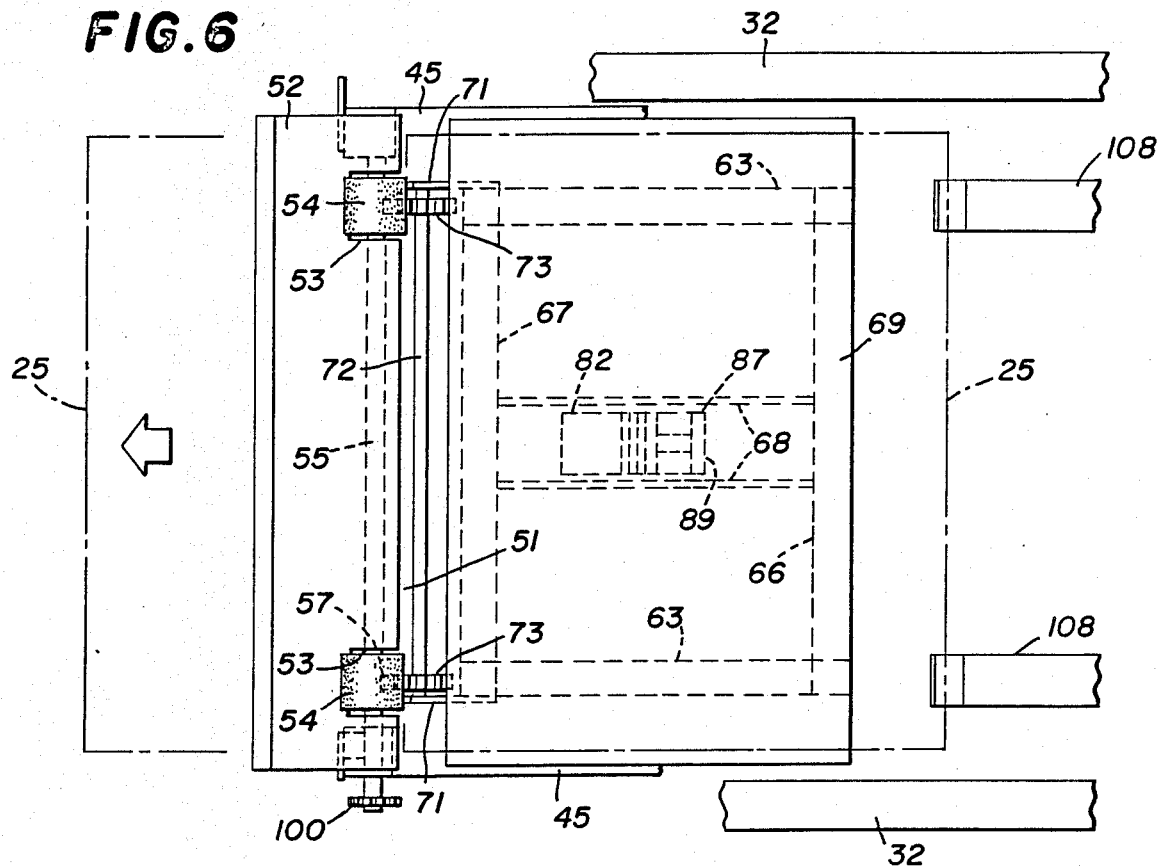
FIG. 6 is a fragmentary plan view of a portion of the system of FIG. 4, taken along the line 6—6 therein.

Referring now to FIGS. 1 and 4–7, the unstacker 40 is carried by the frame 31, which includes a pair of upstanding front posts 41, parallel to and spaced a slight distance laterally inwardly of the rear support posts 32. The rear supports posts 32 are interconnected adjacent to the lower ends thereof by a cross member 42 (see FIG. 4), while the front posts 41 are interconnected adjacent to the lower ends by a front cross member 43 (FIGS. 4 and 5). The opposite ends of the rear cross member 42 are respectively coupled to the opposite ends of the front cross member 43 by a pair of side rails 44 (one shown). The upper ends of the front posts 41 respectively support two parallel inclined rails 45 intermediate their ends, the lower ends of the inclined rails 45 being respectively fixedly secured to the side rails 44 intermediate their ends. The inclined rails 45 are also respectively connected to the rear support posts 32 by substantially horizontal side braces 46 (one shown). A front cross brace 47 (FIG. 5) interconnects the inclined rails 45 at the location where they join the tops of the front posts 41, and a rear cross brace 48 (FIG. 4) interconnects the rear support posts 32 at the locations where they join the side braces 46. A top cross bar 49 interconnects the tops of the rear support posts 32.

Mounted on the frame 31 is a stack support assembly 50 which includes an inclined wall 51 and a carriage assembly 60. More specifically, the inclined wall 51 comprises a rectangular plate which spans the inclined rails 45 from the upper ends thereof to points approximately midway between the upper and lower ends thereof. Integral with the inclined wall 51 at its upper end and projecting forwardly therefrom substantially perpendicular thereto is a top skirt 52 which extends over the upper ends of the inclined rails 45. The top skirt 52 has a pair of laterally spaced-apart rectangular cutouts 53 therein (FIGS. 4 and 5), for respectively accommodating discharge rollers 54 which are rotatably mounted on a shaft 55 (FIG. 4) extending between the upper ends of the inclined rails 45 and journalled in suitable bearings therein (not shown). Preferably, the rollers 54 are formed of a suitable resilient, frictional material, such as rubber or the like, for a purpose to be explained more fully below.

There is also be mounted on the inclined wall 51 adjacent to the upper end thereof a photo-eye sensor 112 (FIGS. 1 and 5) which generates a beam B of light extending generally diagonally from a point just below the shaft 55 adjacent to one end thereof to a point just above the shaft 55 adjacent to the other end thereof, at which it is reflected from a mirror 112a back to the sensor 112. The beam B defines a discharge position on the unstacker 40, as will be explained in greater detail hereinafter. Respectively mounted on the inner surfaces of the inclined rails 45 along the lower halves thereof, are mounting plates 56, which respectively mount elongated racks 57 (FIGS. 4, 5 and 7), having the teeth thereof disposed upwardly. A vertical bearing plate 58 is mounted between one of the front posts 41 and the adjacent inclined rail 45, while a bearing bracket 59 (FIG. 5) is similarly mounted between the other ones of the front posts 41 and inclined rails 45.

The carriage assembly 60 has a rectangular frame which includes a pair of elongated, parallel, front posts 61, which are respectively connected intemediate their ends to the opposite ends of the rear bottom rail 62 by a pair of side rails 63 (see FIG. 4). A pair of rear posts 64 extends upwardly from the opposite ends of the rear bottom rail 62, substantially parallel to the front posts 61. The lower ends of the front posts 61 are interconnected by a lower front rail 65 (FIGS. 1 and 5). The upper ends of the rear posts 64 are interconnected by a top rear rail 66, while the upper ends of the front posts 61 are interconnected by a top front rail 67 (FIG. 4). The front and rear top rails 67 and 66 are interconnected intermediate their ends by a pair of parallel, spaced-apart attachment plates 68, for cooperation therewith to support a flat, planar, rectangular platform 69. The platform 69 lies in a plane which is substantially perpendicular to the plane of the inclined wall 51, for cooperation therewith to define a generally V-shaped trough or receptacle for receiving a stack 21 of pallets 25, as illustrated in FIGS. 1 and 4, with the bottom of the bottom pallet 25 resting on the platform 69, and with the front portions of the peripheral side walls 26 of all of the pallets 25 resting along the inclined wall 51.

The unstacker 40 also has a guide assembly 70, including a pair of rectangular mounting plates 71 respectively fixedly secured to the outer sides of the front posts 61 at the lower ends thereof and projecting forwardly therefrom. The mounting plates 71 are interconnected by a gear shaft 72 (FIGS. 4–6), the opposite ends of which are respectively journalled in suitable bearings (not shown) carried by the mounting plates 71. Respectively fixedly secured to the opposite ends of the gear shaft 72 outboard of the mounting plates 71 are two spur gears 73, respectively disposed in meshing engagement with the racks 57. Each of the mounting plates 71 also carries forwardly of the gear shaft 72 a laterally outwardly extending stub shaft 74 on which is rotatably mounted a cam roller 75, disposed for rolling engagement with the underside of the associated rack 57 to hold the spur gear 73 in meshing engagement therewith. Each of the mounting plates 71 has a clearance slot 76 formed in the upper edge thereof (FIG. 7) for a purpose to be explained below.

Figure 7:
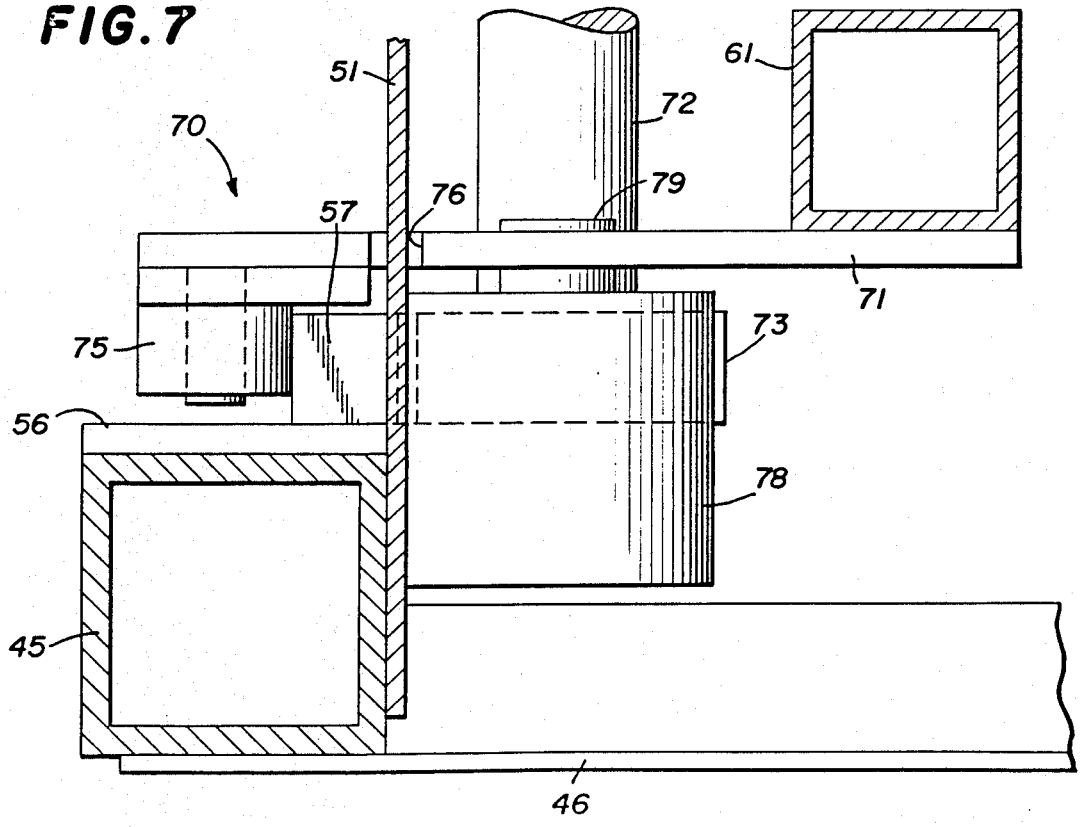
FIG. 7 is a further enlarged, fragmentary sectional view taken along the line 7—7 in FIG. 4.

Respectively secured to the outer sides of the front posts 61 at the upper ends thereof and projecting forwardly therefrom are two support arms 77, each carrying at its outer end a roller 78 mounted for rotation about a stub shaft 79 projecting laterally inwardly from the support arm 77 (FIGS. 4 and 7). In use, the rollers 78 are disposed for rolling engagement with the inclined wall 51 when the gears 73 are disposed in meshing engagement with the racks 57. Thus, it will be appreciated that the gears 73 and the rollers 78 cooperate to support, respectively, the lower and upper ends of the carriage assembly 60, while accommodating reciprocating movement thereof upwardly and downwardly parallel to the inclined wall 51 between a fully retracted position, illustrated in solid line in FIG. 4, and a fully extended position, indicated in broken line therein. It will be appreciated that the cooperation of the gears 73 and the cam rollers 75 with the racks 57 serves to guide the reciprocating movement of the carriage assembly 60 and prevent any lateral movement thereof.

This reciprocating movement of the carriage assembly 60 is effected by a pneumatic carriage drive assembly 80. More specifically, the carriage drive assembly 80 includes an elongated cylinder support bar 81 to which is fixedly secured, by suitable brackets, a long-stroke cylinder 82. The cylinder 82 has a piston rod 83 projecting from the lower end thereof and coupled to a pivot pin 84 disposed in a clevis anchor 85 carried by the rear cross member 42 of the frame 31. The upper end of the cylinder support bar 81 rests upon a cam roller 86 extending between the attachment plates 68 of the carriage assembly 60. Also fixedly secured to the cylinder support bar 81 by suitable mounting brackets is a short-stroke cylinder 87, having an upwardly extending piston rod 88 which is secured to a coupling yoke 89 extending between the attachment plates 68 of the carriage assembly 60. In a preferred embodiment of the invention, the cylinder 87 has a stroke of about 1 inch, while the cylinder 82 has a stroke of about 16 inches.

Thus, it will be appreciated that the cylinders 82 and 87 are essentially connected in series, so that the movement of either one will effect a corresponding movement of the carriage assembly 60. More specifically, the cylinders 82 and 87 are fixedly secured together, so that both operate against the clevis anchor 85.

The unstacking system 20 also includes a main drive assembly 90 for driving the discharge rollers 54 and the infeed conveyor 30. More particularly, the main drive assembly 90 includes an electric drive motor 91 carried by the frame 31 and having a gear reduction assembly 92, the output shaft of which has a sprocket 93 fixed thereto. The sprocket 93 is engaged with an endless chain 94 (FIG. 5) which is also engaged with a sprocket 95 (FIG. 5) fixed to a shaft 96, the opposite ends of which are respectively journalled in suitable bearings (not shown) carried by the bearing plate 58 and the bearing bracket 59. Fixed to the shaft 96 outboard of the bearing plate 58 is a sprocket 97 which engages an endless chain 98, which is trained over a chain tensioning sprocket 99 carried by the bearing plate 58 and is then engaged with a sprocket 100 (FIGS. 1 and 5) fixed to one end of the discharge roller shaft 55. Thus, it will be appreciated that when the drive motor 91 is operated, the discharge rollers 54 are continuously driven in a counterclockwise direction, as viewed in FIGS. 1 and 4.

Fixed to the other end of the shaft 96 outboard of the bearing bracket 59 is a sprocket 101, which is engaged with an endless chain 102. The chain 102 is trained over a chain tensioning sprocket 103 carried by the bearing bracket 59 and is engaged with a sprocket 104 fixed on a clutch/brake (not shown) mounted on the drive shaft 35 of the infeed conveyor 30. Thus, it will be appreciated that the clutch/brake is continuously driven by the drive motor 91 and is selectively engaged by a control circuit 110 (FIG. 12), to be explained below, for selectively driving or stopping the infeed conveyor 30.

The unstacker 40 also includes a pair of retaining assemblies 105. More particularly, each of the retaining assemblies 105 includes a pair of bearings 106 mounted on the cross bar 49 of the frame 31 and rotatably mounting therebetween a pivot shaft 107. Fixedly secured to each shaft 107 is one end of an associated one of a pair of elongated retaining arms 108, which project forwardly for retaining engagement with the rear end of the top pallet 25 in a stack 21 disposed in the unstacker 40.

Figure 12:
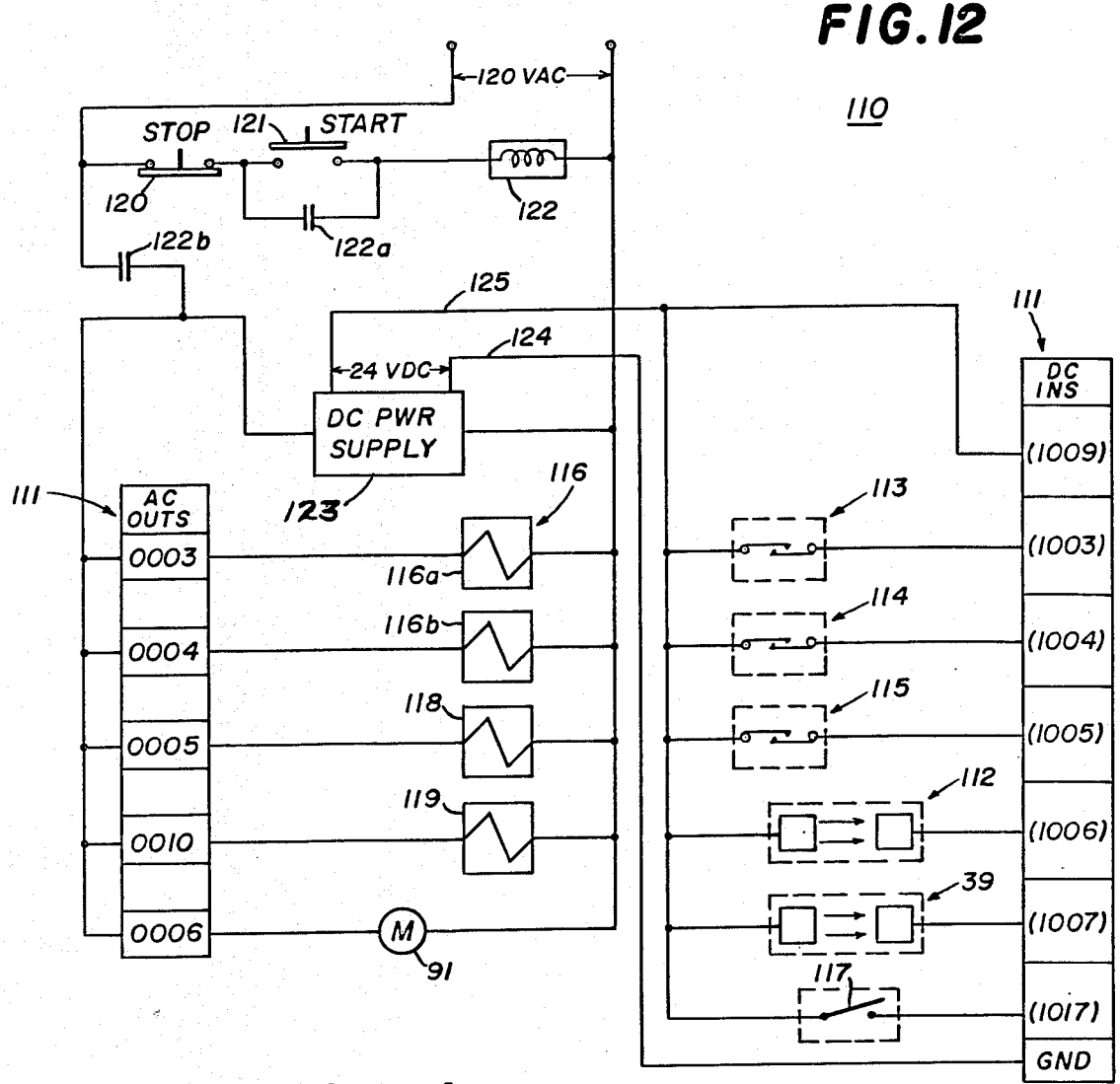
FIG. 12 is a schematic diagram of a control circuit for the system of FIG. 1.

Referring now to FIG. 12, there is illustrated an electric control circuit 110 for controlling the operation of the unstacking system 20. The control circuit 110 includes a programmable controller 111 operating under stored program control. The programmable controller 111 may be any of a number of different types of commercially available controllers, such as that sold by Gould, Inc. under the designation "Modicon Micro 84", or that sold by Allen-Bradley, Co. under the designation SLC-100. In FIG. 12, the programmable controller 111 has been illustrated in two blocks, one having AC output terminals and the other having DC input terminals. Associated with each such terminal is a four digit number designating the software address of the function associated with that terminal. Each four digit number corresponds to a software function. Where the address number corresponds to a relay coil function the number is placed in parentheses. As will be more apparent in connection with FIGS. 13A and B, to be described below, all of the contact functions associated with a software relay function are designated by the same address number (but not in parentheses). Input function addresses begin with the numeral "1", while output function addresses begin with the numeral "0". Time delay functions, which will be described in connection with FIGS. 13A and B, begin with the numeral "4". All relay contact functions in FIG. 12 are normally-open contact functions.

The programmable controller 111 is connected in circuit with a number of control elements, including the photo eye 39, the photo eye 112 which generates the discharge beam B, a reed switch 113 which closes when the long-stroke cylinder 82 is fully retracted, a reed switch 114 which closes with the long-stroke cylinder 82 is fully extended, a reed switch 115 which closes when the short-stroke cylinder 87 is extended, a dual solenoid unit 116, including a solenoid 116a which opens the valve to control retraction or downward-movement of the long-stroke cylinder 82, and a solenoid 116b which opens the valve to control extension or upward movement of the long-stroke cylinder 82, a solenoid 118 which closes the valve to control extension or upward movement of the short-stroke cylinder 87, and a solenoid 119 which controls operation of the clutch/brake on the infeed conveyor drive shaft 35.

FIG. 12 constitutes a simplified wiring diagram for the control circuit 110. The circuit is provided with a suitable source of AC power, such as a 60 Hz, 120 VAC supply. Connected in series across the AC supply are a normally-closed push-button STOP switch 120, a normally-open push-button START switch 121 and the coil of a control relay 122. Normally-open contacts 122a of the relay 122 are connected in parallel with the START switch 121 for latching the relay 122 in its energized condition. Normally-open contacts 122b of the relay 122 are connected in series in the hot AC supply line, which is then fed to AC input terminals of the programmable controller 111. A 24 VDC power supply 123 is connected between the controller side of the relay contacts 122b and the ground wire of the AC supply. The solenoids 116a, 116b and 118, the motor 91 and the clutch/brake solenoid 119 are, respectively, connected between the ground wire of the AC line and the terminals 0003, 0004, 0005, 0006 and 0010 of the programmable controller 111. The output terminals of the DC power supply 123 are respectively connected to conductors 124 and 125. Conductor 125 is connected to a ground terminal of the programmable controller 111, while a number of input devices are connected between the conductor 125 and various DC input terminals of the programmable controller 111, the conductor 125 being directly connected to terminal (1009). Thus, the reed switches 113, 114 and 115 are, respectively, connected to terminals (1003), (1004), and (1005), the photo eyes 112 and 39 are respectively connected to the terminals (1006) and (1007), and a system call switch 117 is connected to terminal (1017).

Figure 13A:
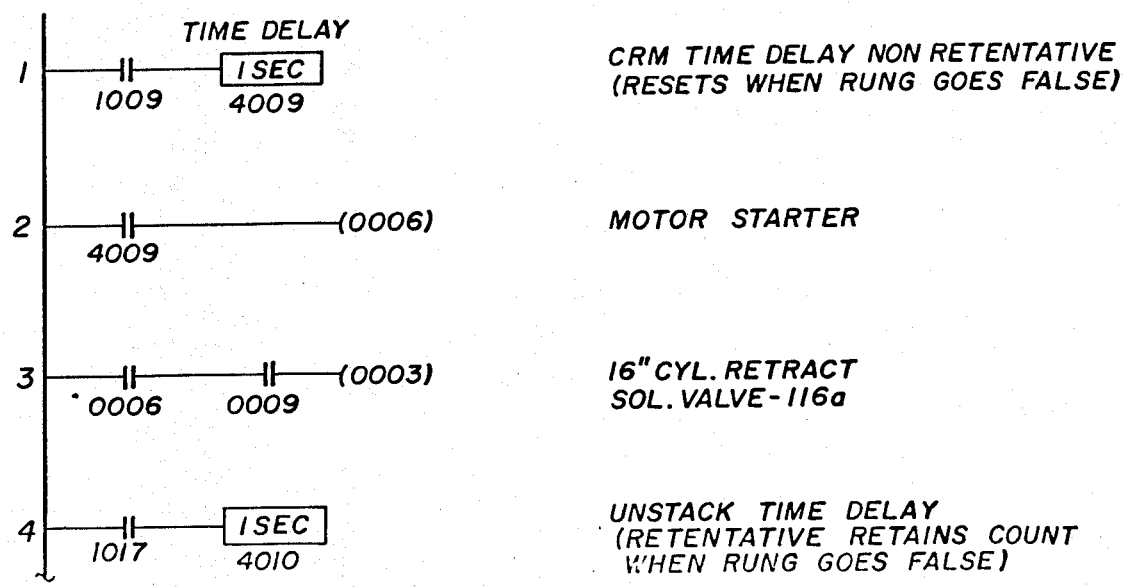
FIGS. 13A and 13B are a "rung logic" diagram of the control program for the programmable controller of FIG. 12.

Referring now to FIGS. 12 and 13A and B, the operation of the unstacking system 20 will be explained in detail. FIGS. 13A and B are a diagrammatic representation of the control program for the programmable controller 111, illustrated in "rung logic" form, which is analogous to a standard control circuit. Listed in the right-hand margin opposite each rung of the diagram is a notation explaining the relay or time delay function of that rung.

For purposes of illustration, it will be assumed that, initially, the carriage assembly 60 is in its fully retracted, stack-receiving configuration, illustrated in FIGS. 1 and 4, and is empty, and that a stack 21 is positioned at the discharge end of the infeed conveyor 30, as illustrated in FIG. 4. However, it will be appreciated that the unstacker 40 could be started from any other position. Initially, the START switch 121 is closed, energizing the relay 122 and closing its contacts 122a and 122b. Closure of the contacts 122a latches the relay 122 energized, and closure of the contacts 122b supplies AC power to the programmable controller 111 and to the DC power supply 123. DC power on the conductors 124 and 125 turns on relay function (1009), which closes its contact function at rung 1 to actuate the one-second time delay 4009 which, after one second, turns on relay function (0006) at rung 2 to start the motor 91.

Figure 13B:
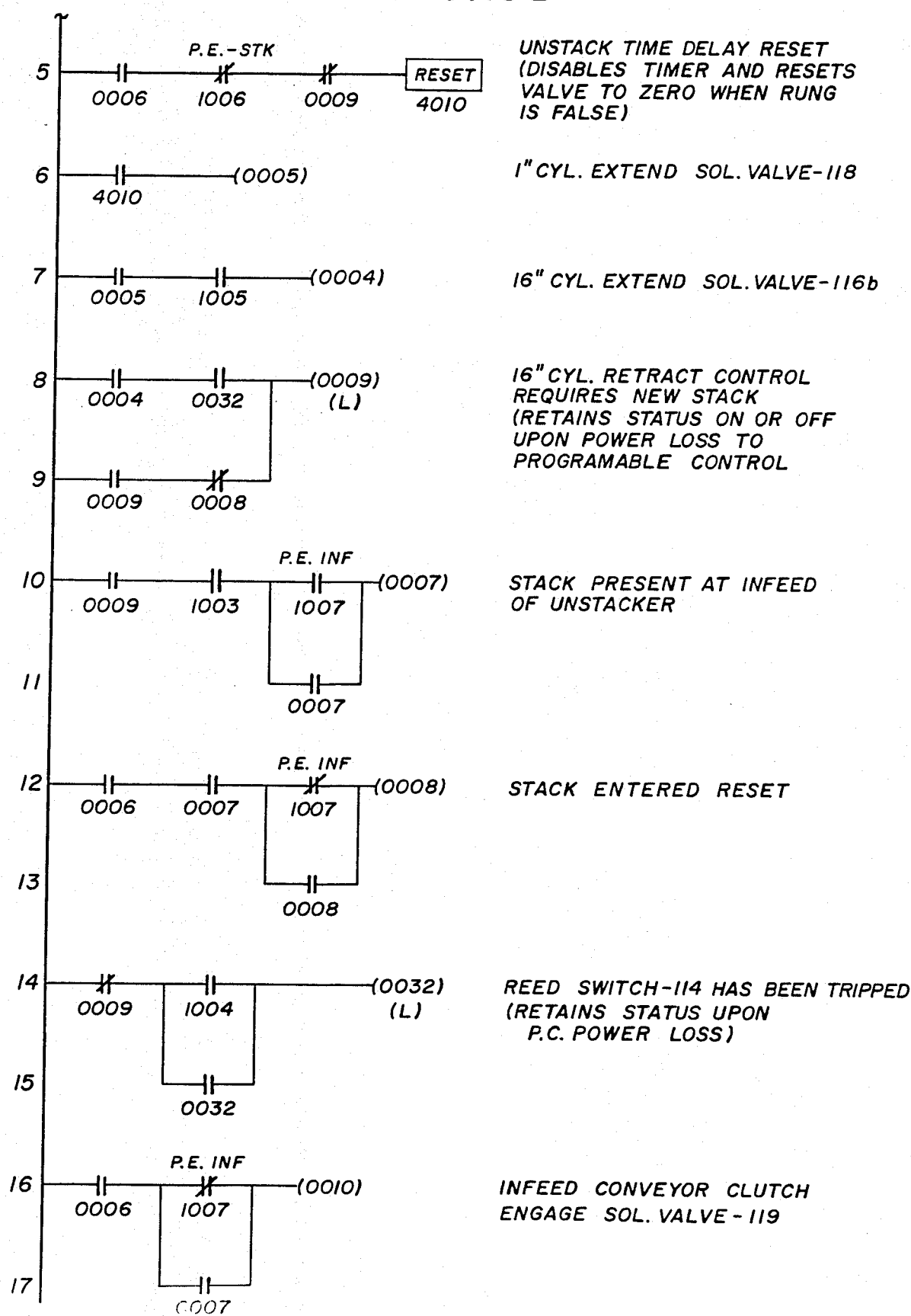

As will be explained more fully below, in order to retract the long-stroke cylinder 82, it is necessary for the relay function (0009) to be energized at rung 8 of FIG. 13B. This function is such that it retains its status upon power loss, such as when the system is turned off. Thus, when the system is restarted at the above-presumed initial conditions with the long-stroke cylinder 82 fully retracted, the relay function (0009) will still be on, and will be latched on via rung 9. Contact functions will also be closed at rungs 3 and 10 and will be open at rungs 5 and 14. In the presumed initial conditions, reed switch 113 will be closed, holding the relay function (1003) on and closing its contact function at rung 10. The photo eye 112 will be in its normally-open condition, holding the relay function (1006) in its normally-off condition, maintaining the contact function closed at rung 5. The photo eye 39 will be closed, thereby turning on the relay function (1007), thereby closing its contact function at rung 10 and opening its contact functions at rungs 12 and 16.

Thus, it will be apparent that when the system is powered up in the presumed initial conditions, all of the contact functions on rung 10 will be closed, turning on the relay function (0007), which closes its contact functions at rungs 12 and 17. Accordingly, it can be seen that when the motor start relay function (0006) is turned on at rung 2, the closure of its contact function at rung 3 turns on the relay function (0003), thereby energizing the solenoid 116a to hold the long-stroke cylinder 82 in its retracted condition. The closure of the 0006 contact function at rung 5 has no effect, because the 0009 contact function is open. Similarly, the closure of the 0006 contact function at rung 12 has no effect, because the 1007 contact function is open. The closure of the 0006 contact function at rung 16 turns on the relay function (0010) via the closed contact function 0007, closing its contact function to actuate the clutch/brake solenoid 119 and engage the clutch to start the infeed conveyor 30.

Thus, the stack 21 disposed at the exit end of the feed conveyor 30 is delivered to the stack support assembly 50. More particularly, as can be seen in FIGS. 1 and 4, when the carriage assembly 60 is fully retracted, the upper edge of the platform 69 is positioned just below the plane of the support reach 36 of the infeed conveyor 30 and closely adjacent to the discharge end thereof, so that the stack 21 simply slides down along the platform 69 until it stops against the inclined wall 51.

As soon as the stack 21 tips into the carriage assembly 60, the beam of the photo eye 39 is reestablished, returning it to an open circuit. But the infeed conveyor 30 will continue running until the next stack 21 breaks the beam of the photo eye 39, at which point the solenoid is 119 deenergized, disengaging the clutch/brake to stop the infeed conveyor 30. More particularly, when the photo eye 39 reopens, it returns the relay function (1007) to its normally-off condition, reopening its contact function at rung 10 and reclosing its contact functions at rungs 12 and 16. The closure of the contact function at rung 12 turns on the relay function (0008), which latches on at rung 13, and also opens its contact function at rung 9, turning off relay function (0009). When relay function (0009) turns off, its contact function at rung 10 opens, turning off relay function (0007), thereby opening its contact function at rung 17. The infeed conveyor 13 continues to run, however, because the 1007 contact function at rung 16 is closed. When the next stack 21 arrives at the discharge end of the infeed conveyor 30, it blocks the photo eye 39, turning on relay function (1007), thereby opening its contact function at rung 16 to actuate the clutch/brake to stop the infeed conveyor 30.

It can be seen that when the stack 21 is disposed on the carriage assembly 60, the lateral sides of the stack, respectively, lie in parallel vertical planes. As can best be seen in FIG. 5, the beam B of the photo eye 112 intercepts the left-hand one of these vertical planes substantially at the level of the axis of the shaft 55, which level is designated "L" (see FIGS. 4, 8 and 9), and defines a discharge position.

After loading of the first stack 21 into the stack support assembly 50, the height of the stack will be such that it does not extend up to the discharge level L, as indicated in FIG. 8. Therefore, the photo eye 112 remains open, leaving the relay function (1006) off, so that its contact function at rung 5 remains closed. When the relay function (0009) went off at rung 8, it opened its contact function at rung 3 to turn off relay function (0003), thereby deenergizing the solenoid 116 and releasing the long-stroke cylinder 82. Also, the 0009 contact functions at rungs 5 and 14 reclosed.

When the system calls for pallets, the switch 117 is closed to turn on the relay function (1017), thereby closing its contact function at rung 4 to actuate the one-second time delay 4010. Since rung 5 is closed (because photo eye 112 remains open, leaving relay function (1006) on), the time delay is enabled from zero. Therefore, after one second the contact function at rung 6 is closed, turning on relay function (0005), thereby closing its contact function at rung 7 and energizing the solenoid 118 to cause the short-stroke cylinder 87 to extend to its full extent, to the position illustrated in FIG. 9. This closes the reed switch 115.

If this extension of the short-stroke cylinder 87 is sufficient to cause the top pallet 25 in the stack 21 to interrupt the beam B at the level L, then the top pallet 25 will be in its discharge position, and will be engaged by the discharge rollers 54 to lift the leading edge of the top pallet 25 from the stack 21, as indicated in FIG. 10. The retaining arms 108 serve to hold the top pallet 25 against the rollers 54 with a slight pressure to prevent kickback of the pallet 25 as it is engaged by the rollers 54. In this event, the photo eye 112 is blocked, turning on the relay function (1006), which opens its contact function at rung 5 to reset the one-second time delay 4010. This opens the contact function at rung 6 to turn off the relay function (0005), thereby deenergizing the solenoid 118 and allowing the short-stroke cylinder 87 to retract. Retraction of the short-stroke cylinder 87 to the position illustrated in FIG. 11, drops the stack 21 about one inch to facilitate separation of the top pallet 25 therefrom. Because the beam B is inclined, the top pallet 25 will not clear the right-hand end of the beam B, as viewed in FIG. 5, until the pallet has been completely discharged. Also, the 0005 contact function at rung 7 opens to prevent the relay function (0004) from turning on. When the discharged pallet clears the unstacker 40, the photo eye 112 reopens, turning the relay function (1006) back off to again enable the one-second time delay 4010, thereby to repeat the cycle of extension of the short-stroke cylinder 87, as long as the system is still calling for pallets.

However, if the extension of the short-stroke cyliner 87 is not sufficient to bring the top pallet 25 to its discharge position, as illustrated in FIG. 9, then the short-stroke cylinder 87 will remain extended. Since this time the photo eye 112 is not broken, the time delay 4010 is not reset, so relay function (0004) turns on to energize the solenoid 116b, and the long-stroke cylinder 82 will begin to extend and continue extending until the top pallet 25 in the stack 21 reaches its discharge position, as indicated in FIG. 10, breaking the beam B. At this point, the time delay 4010 resets, as explained above, to allow the short-stroke cylinder 87 to retract and turning off relay function (0004) to stop the extension of the long-stroke cylinder 82. After the top pallet 25 has been completely discharged, the beam B of the photo eye 112 will be reestablished, causing the short-stroke cylinder 87 to again extend, to repeat the cycle, the long-stroke cylinder 82 remaining in its partially-extended position.

Thus, it can be seen that, for the discharge of each pallet 25, the carriage assembly 60 will undergo a cycle wherein the short-stroke cylinder 87 extends, the long-stroke cylinder 82 extends (if necessary) and then the short-stroke cylinder 87 retracts. This cycling will continue until the last pallet 25 has been discharged from the unstacker 40. During the next cycle the long-stroke cylinder 82 will continue up until it reaches its full extension, at which point the reed switch 114 will be closed, turning on the relay function (1004). This closes its contact function at rung 14, turning on the relay function (0032), which latches on at rung 15, and closes this contact function at rung 8 to turn on the relay function (0009). Relay function (0009) latches on at rung 9, and closes its contact function at rung 3 to turn on the relay function (0003), thereby energizing the solenoid 116 to retract the long-stroke cylinder 82. When the long-stroke cylinder 82 has been fully retracted, the reed switch 113 closes, turning on the relay function (1003), which closes its contact function at rung 10 to turn on the relay function (0007), thereby closing its contact function at rung 17 to restart the conveyor 30 and deliver the next stack 21 to the carriage assembly 60, as described above.

It is a significant aspect of the invention that this cyclical extension and retraction of the short-stroke cylinder 87 for each pallet discharge, serves to greatly assist the separation of the top pallet 25 from the remainder of the stack 21, particularly in the case of nested pallets 25. Furthermore, because the pallets 25 are engaged only at their front walls by the discharge wheels 54, the unstacker 40 operates with any type of pallet 25, regardless of its depth or bottom configuration. Thus, there is provided a smooth and rapid unstacking of the pallets 25 and a rapid continuous handling of a series of the stacks 21, all in a fully-automatic mode of operation.

From the foregoing, it can be seen that there has been provided an improved unstacking system which is of relatively simple and economical construction, operates readily with any type of pallet container, and is capable of swift and fully-automatic operation.

I claim:

1. Apparatus for removing articles one at a time from the top of a stack of articles having an axis intersecting the top and bottom articles in the stack at the centers thereof, said apparatus comprising: stack support means for receiving the stack thereon, said support means including carriage means movable with respect to the remainder of said support means for effecting reciprocating movement of the stack in directions parallel to its axis; drive means coupled to said carriage means for effecting movement thereof and of the stack thereon between a discharge condition wherein the top article in the stack is disposed in a discharge position and a withdrawn condition below said discharge condition; discharge means engageable with the top article in the stack when it is disposed in its discharge position for removing it from the stack and moving it from its discharge position; and control means coupled to said drive means for controlling the operating thereof, of, said control means being responsive to movement of the top article to its discharge position for causing movement of the carriage means to its withdrawn condition while said discharge means is moving the top article from its discharge position to facilitate separation of the top article from the stack, said control means being responsive to removal of the top article from its discharge position and from the stack when said carriage means is in its withdrawn condition for causing movement of the carriage means back to its discharge condition.

2. The apparatus of claim 1, wherein said stack support means includes an inclined support wall, said carriage means being movable parallel to said support wall for sliding the stack therealong.

3. The apparatus of claim 2, wherein said discharge means includes a discharge roller disposed at the upper end of said support wall for rotation about an axis parallel to said support wall, said roller being dimensioned for frictional engagement with an edge of the top article lying along said support wall for lifting that edge from the stack and feeding the article off the stack.

4. The apparatus of claim 3, and further comprising retaining means engageable with the top article in the stack in its discharge position for preventing movement of the article away from the support wall in response to engagement of the article by said discharge roller.

5. The apparatus of claim 2, wherein said carriage means includes support wheels disposed for rolling engagement with said support wall to provide support for said carriage means during the reciprocating movement thereof.

6. The apparatus of claim 1, wherein said carriage means includes a platform engageable with the bottom of the stack and guide means for guiding the reciprocating movement of said carriage means.

7. The apparatus of claim 1, and further comprising rack means disposed on said remainder of said support means and pinion means mounted on said carriage means and disposed for meshing engagement with said rack means to guide the reciprocating movement of said carriage means.

8. Apparatus for removing articles one at a time from the top of a stack of articles having an axis intersecting the top and bottom articles in the stack at the centers thereof, said apparatus comprising: stack support means for receiving the stack thereon, said support means including carriage means movable with respect to the remainder of said support means for effecting reciprocating movement of the stack in directions parallel to its axis; drive means coupled to said carriage means for effecting movement thereof and of the stack thereon between a discharge condition wherein the top article in the stack is disposed in a discharge position and a withdrawn condition below said discharge condition; said drive means including first motor means movable over only a short distance in extending and retracting directions between fully extended and retracted conditions for moving said carriage means toward and away from its discharge condition, and second motor means movable over a long distance in extending and retracting directions for moving said carriage means toward and away from its discharge condition; discharge means engageable with the top article in the stack when it is disposed in its discharge position for removing it is disposed in its discharge position for removing it from the stack; and control means coupled to said first and second motor means for controlling the operation thereof, said control means being responsive to disposition of said first motor means in its fully retracted condition when the top article in the stack is not disposed in its discharge position for moving said first motor means to its fully extended condition, said control means being responsive to disposition of said first motor means in its fully extended condition when the top article of the stack is not in its discharge position for moving said second motor means in an extending direction until the top article in the stack is in its discharge position, said control means being responsive to arrival of the top article in the stack at its discharge position for moving said first motor means to its retracted condition to facilitate separation of the top article from the stack.

9. The apparatus of claim 8, wherein each of said first and second motor means includes a fixed means and a movable means, said fixed means of said second drive means being coupled to the remainder of said support means, said fixed means of said first motor means being carried by said movable means of said second motor means, said movable means of said first motor means being coupled to said carriage means.

10. The apparatus of claim 8, wherein each of said first and second motor means includes a pneumatic cylinder.

11. The apparatus of claim 10, wherein the stroke of said first drive means is substantially equal to the depth of an article in directions parallel to said axis.

12. The apparatus of claim 8, wherein said second motor means is movable between fully extended and fully retracted conditions, said control means being responsive to disposition of said second motor means in its fully extended condition when there is no article in a discharge position for moving said second motor means to is fully retracted condition.

13. A system for removing articles one at a time from stacks of articles each having an axis intersecting the top and bottom articles in the stack at the centers thereof, said system comprising: infeed conveyor means for delivering stacks of articles sequentially to an unstacking station; stack support means at said unstacking station for receiving a stack from said infeed conveyor means, said support means including carriage means reciprocatively movable with respect to the remainder of said support means to and from a fully-retracted stack-receiving configuration for effecting reciprocating movement of a supported stack in directions parallel to its axis; drive means coupled to said carriage means for effecting movement thereof and of the stack thereon between a discharge condition wherein the top article in the stack is disposed in a discharge position and a withdrawn condition below said discharge condition; discharge means engageable with the top article in the stack when it is disposed in its discharge position for removing it from the stack and moving it from its discharge position; and control means coupled to said drive means and to said infeed conveyor means for controlling the operation thereof, said control means being responsive to disposition of said carriage means in its fully-retracted stack-receiving configuration for operating said infeed conveyor means to deliver a stack to said stack support means, said control means being responsive to delivery of a stack to said stack support means for stopping said infeed conveyor means, said control means being responsive to movement of the top article to its discharge position for causing movement of the carriage means to its withdrawn condition while said discharge means is moving the top article from its discharge position to facilitate separation of the top article from the stack, said control means being responsive to removal of the top article from its discharge position and from the stack when said carriage means is in its withdrawn condition for causing movement of the carriage means back to its discharge condition.

14. The system of claim 13, and further comprising a drive assembly coupled to said discharge means and to said infeed conveyor means for operating same.

15. The system of claim 14, wherein said drive assembly includes continuously operating motive means, and clutch means coupling said motive means to said infeed conveyor means, said control means engaging said clutch means when said carriage means is disposed in its stack-receiving configuration and disengaging said clutch means after a stack has been delivered from said infeed conveyor to said stack support means.

16. The system of claim 14, wherein said discharge means includes a discharge roller frictionally engageable with the top article in the stack for lifting it and feeding it from the stack.

17. The system of claim 13, wherein said stack support means includes an inclined support wall.

18. The system of claim 17, wherein said discharge means includes a discharge roller disposed at the upper end of said support wall for rotation about an axis parallel to said support wall.

19. The system of claim 18, and further comprising guide means including rack means disposed on said remainder of said support means and pinion means mounted on said carriage means and disposed for meshing engagement with said rack means to guide the reciprocating movement of said carriage means.

* * * * *